US012765580B2

(12) United States Patent
Barton et al.

(10) Patent No.: US 12,765,580 B2
(45) Date of Patent: Oct. 20, 2026

(54) METHOD AND APPARATUS FOR PRODUCING SPIRAL PET TREAT

(71) Applicant: Blue Buffalo Enterprises, Inc., Wilton, CT (US)

(72) Inventors: Lynn K Barton, St. Louis Park, MN (US); Emily Lauren Fort, Cave Springs, AR (US); Megan Keough, Minneapolis, MN (US); Jie Sun, Plymouth, MN (US)

(73) Assignee: Blue Buffalo Enterprises, Inc., Wilton, CT (US)

( * ) Notice: Subject to any disclaimer, the term of this patent is extended or adjusted under 35 U.S.C. 154(b) by 149 days.

(21) Appl. No.: 17/865,168

(22) Filed: Jul. 14, 2022

(65) Prior Publication Data

US 2024/0016189 A1 Jan. 18, 2024

(51) Int. Cl.
*A23L 27/20* (2016.01)
*A23K 40/25* (2016.01)
(Continued)

(52) U.S. Cl.
CPC .............. *A23K 40/25* (2016.05); *A23K 50/42* (2016.05); *A23V 2300/16* (2013.01)

(58) Field of Classification Search
CPC .... A23K 40/25; A23K 50/42; A23V 2300/16; A23N 17/005; A23P 30/20
(Continued)

(56) References Cited

U.S. PATENT DOCUMENTS 2,726,156 A 12/1955 Armstrong
3,156,194 A 11/1964 Scott
(Continued)

FOREIGN PATENT DOCUMENTS

CN 301568330 1/2011
CN 304364719 11/2017
CN 306454518 4/2021
(Continued)

OTHER PUBLICATIONS

Valuepetsupplies, ValueBull USA Collagen Sticks (https://www.amazon.com/ValueBull-Collagen-Sticks-Lightly-Smoked/dp/B09PGTFT8V?th=1 Accessed on Feb. 1, 2024). Date Available for Sale on Amazon.com: Dec. 30, 2021 (Year: 2021).*

Istock, Accessed at: https://www.istockphoto.com/vector/protect-gm1017255856-273584260, Upload date: Aug. 18, 2018. (Year: 2018).*

*Primary Examiner* — Nikki H. Dees
*Assistant Examiner* — Stephanie R Gerla
(74) *Attorney, Agent, or Firm* — Jordan IP Law, LLC; Annette M. Frawley, Esq.

(57) ABSTRACT

A method and apparatus for the automated mass production of spiral body pet treats, particularly chewable, spiraling rawhide-type pet treats, employs an extruder for extruding at least one rope in the form of a spiraling cross-sectional body having a plurality of radially spaced layers and an outer terminal end portion which is radially in-turned and conjoined with an adjacent one of the plurality of radially spaced layers. The rope is cut by a cutting assembly at longitudinally spaced locations in creating spiral shaped intermediate products which are then dried to form the spiral body pet treats. The spiral body pet treats are hard when dried but, with the radially in-turned outer terminal end portion being joined to a radially inward spiral layer, no terminal edge with potentially sharp contact points is exposed.

16 Claims, 2 Drawing Sheets

(51) Int. Cl.

| | |
|---|---|
| ***A23K 50/42*** | (2016.01) |
| ***A23L 19/00*** | (2016.01) |
| ***A23L 27/00*** | (2016.01) |
| ***A23L 27/12*** | (2016.01) |

(58) Field of Classification Search
USPC ......... 264/150; 426/448, 512, 514, 516, 517
See application file for complete search history.

(56) References Cited

U.S. PATENT DOCUMENTS

| | | | |
|---|---|---|---|
| 3,227,103 A | 1/1966 | Schafer | |
| D234,099 S | 1/1975 | Gobble et al. | |
| 6,106,880 A | 8/2000 | Harada et al. | |
| 6,165,522 A | 12/2000 | Lira | |
| 6,277,420 B1 | 8/2001 | Andersen et al. | |
| 6,468,569 B1 | 10/2002 | Dunker et al. | |
| D476,118 S | 6/2003 | Kirch | |
| D494,735 S | 8/2004 | Dahl et al. | |
| D505,533 S | 5/2005 | Jia et al. | |
| D508,762 S | 8/2005 | Jia et al. | |
| D512,199 S | 12/2005 | Abañez | |
| D645,638 S | 9/2011 | Mingyun et al. | |
| D713,118 S | 9/2014 | Park et al. | |
| D732,791 S | 6/2015 | Enoch et al. | |
| D840,609 S | 2/2019 | Axelrod et al. | |
| D897,626 S | 10/2020 | Gornell et al. | |
| D901,130 S | 11/2020 | Van Dijk | |
| D930,321 S | 9/2021 | Kreamer | |
| 2008/0145485 A1* | 6/2008 | Tepper .................. | A23K 50/42 426/272 |

FOREIGN PATENT DOCUMENTS

| | | |
|---|---|---|
| EP | 2 401 926 | 1/2012 |
| WO | WO 2021/216854 | 10/2021 |

* cited by examiner

METHOD AND APPARATUS FOR PRODUCING SPIRAL PET TREAT

FIELD OF THE INVENTION

The invention generally pertains to the art of edible pet products and, more particularly, to a method and apparatus for extruding and cutting a spiraling intermediate product having a radially in-turned outer terminal end portion, with the intermediate product being dried to establish a pet treat, such as rawhide-type chew treat(s).

BACKGROUND OF THE INVENTION

It is known in the food art to form pet chew treats by forming a dough, sheeting the dough, cutting the sheet in to strips, rolling the strips to create individual spiral products and drying the spiral products to establish hard, rawhide-type pet chew products. Although such pet treats are popular, these products, as well as the manner in which they are made, present various drawbacks. For instance, the overall process is quite labor intensive, particularly as the products are typically rolled by hand. In addition, each formed product includes an outer longitudinal edge which, upon drying, becomes spaced from the adjacent layer of the spiral product. As the product dries hard, this entire edge establishes a series of sharp contact points which, when being consumed, can be hazardous to a pet. Furthermore, it is quite common to package multiple such products together by wrapping the products in sealed flexible packaging. However, the sharp contact points can readily poke holes in the packaging, potentially causing mold or other microbial issues.

With the above in mind, it is desired to provide a method and apparatus for mass producing pet chews treats, particularly employing a continuous, non-labor intensive extrusion production operation in creating products without sharp outer contact points, thereby avoiding packaging damage and pet issues experienced with the known prior art.

SUMMARY OF THE INVENTION

The present invention is concerned with a method and apparatus for producing pet treats comprising spiraling cross-sectional bodies with extrusion technology. More particularly, in accordance with a preferred embodiment of the invention, various laterally spaced dough ropes are extruded and fed to a cutter assembly, such as a rotary, linear, ultrasonic or the like cutter assembly, wherein each rope is cut in at least two longitudinally spaced locations to create intermediate products of predetermined length. The intermediate products are then exposed to a drying operation to establish the pet treats, such as in the form of hard, spiraling rawhide-type chew treats for dogs, with each pet treat having a plurality of radially spaced, spiraling layers and an outer terminal end portion which is radially in-turned and conjoined with an adjacent one of the plurality of radially spaced layers. With this construction, the outer terminal end portion of the spiral pet treat body lacks an exposed terminal edge, thereby avoiding the potential for sharp protruding contact points along the length of the product.

Additional objects, features and advantages of the invention will become more readily apparent from the following description of preferred embodiments of the invention when taken in conjunction with the drawings wherein like reference numerals refer to corresponding parts in the several views.

DETAILED DESCRIPTION OF THE INVENTION

Figure 1:
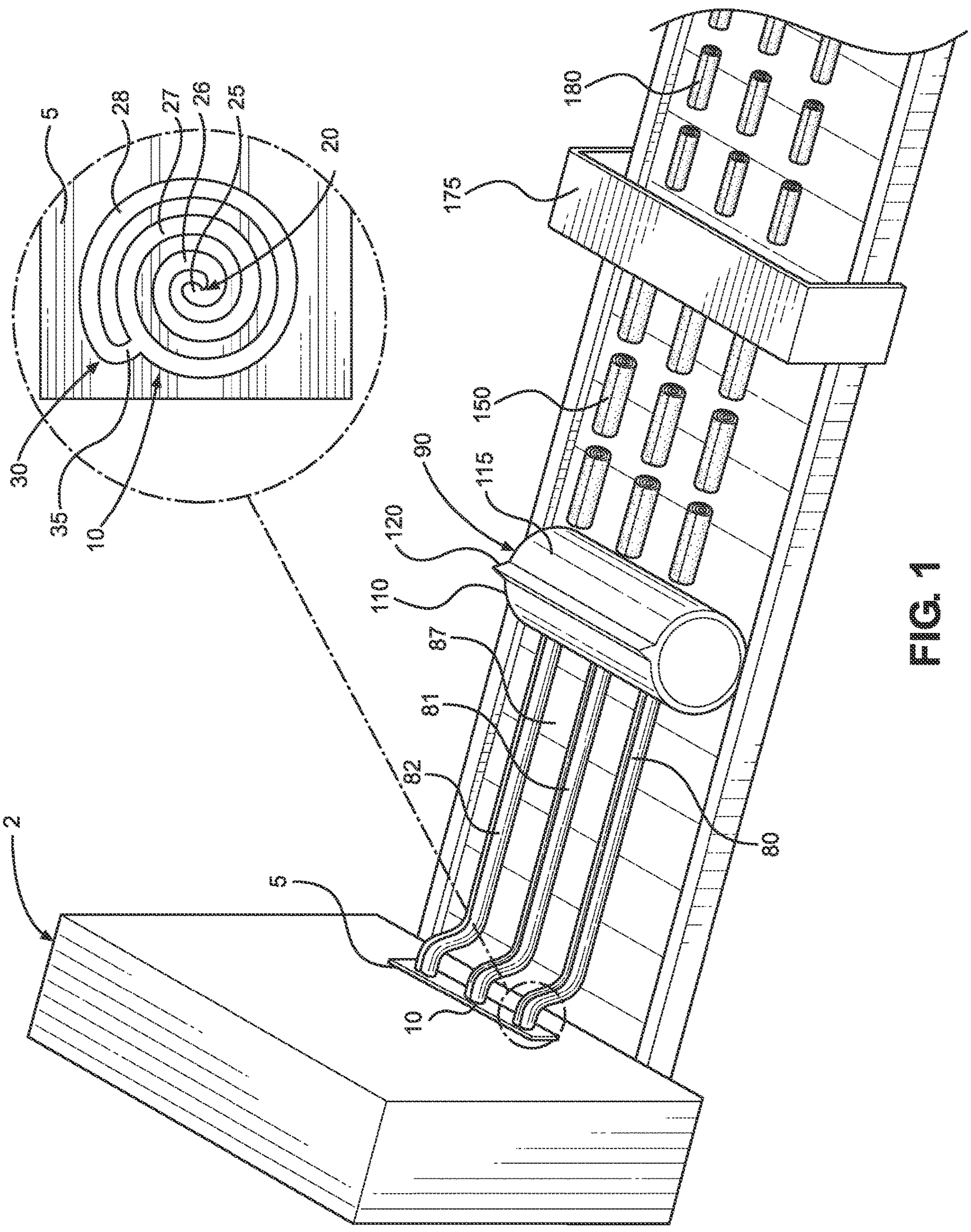
FIG. 1 is a perspective view of a portion of a manufacturing line for producing spiral body pet treats in accordance with the invention.

As indicated above, FIG. 1 illustrates a portion of an exemplary manufacturing line for the automated mass production of spiral body pet treats in accordance with the invention. This arrangement employs a multi-row extruder 2 including a die plate 5 having a plurality of laterally spaced heads or dies, one of which is indicated at 10. As shown in the enlarged view, each die 5 is defined by a port or an opening in die plate 5, with the extrusion opening taking a generally spiral form. Of course, other arrangements are equally applicable, such as die plate 5 threadably or otherwise receiving various selectively replaceable die inserts to establish the requisite opening. In the embodiment shown, the spiraling extrusion opening includes a central starting region 20, a plurality of radially spaced layered regions 25-28 and an outer terminal end region 30. Because of the configuration of the overall extrusion opening, bridge supports, such as a mesh or pins, are provided internally (not shown) between the various radially spaced layered regions 25-28 and die plate 5 while still allowing the dough to coalesce to the desired shape. At this point, it should be recognized that the number of spiral layered regions could vary without departing from the invention, but preferably is in the range of 3-5. Important in connection with the invention is outer terminal end region 30 is radially in-turned at 35 such that layered region 28 is conjoined with adjacent layered region 27 and the outermost spiral layered region 28 advantageously lacks an exposed terminal edge for reasons which will be detailed fully below. In any case, as shown, extruder 2 forms a plurality of elongated, laterally spaced extrudate rows deposited in the form of continuous ropes 80-82 onto a common conveyor 87.

Downstream of extruder 2 is provided a cutting assembly which is generally indicated at 90 extending across conveyor 87. Cutting assembly 90 includes a roller 110 having an associated motor driven drive shaft (not shown) for rotating roller 110 and an outer surface 115 from which project one or more cutting members, such as a blade indicated at 120. With this arrangement, each rope 80-82 passing beneath roller 110 upon moving conveyor 87 will be cut by the one or more cutting members in forming individual, spiral shaped (in cross-section) intermediate products 150. The length of each intermediate product 150 will depend on various factors, including the speed of extrusion and conveyance, the rotational speed of roller 110 and the number of cutting members 120 provided circumferentially spaced about roller 110. Overall, the length can vary significantly but, in most preferred forms of the invention, the resulting pet treat has a length in a range of approximately 5-30 cm.

After being cut to a desired length, the intermediate products 150 need to be dried. Although drying could proceed under ambient conditions, FIG. 1 illustrates the inclusion of a dryer unit 175 downstream of cutting assembly 90, with conveyor 87 directing intermediate products 150 through dryer unit 175 in producing the final pet treats 180 having spiraling bodies in cross-section. At this point, pet treats 180 can be transported to a further downstream location where they are packaged for shipping and consumer sale.

Figure 2:
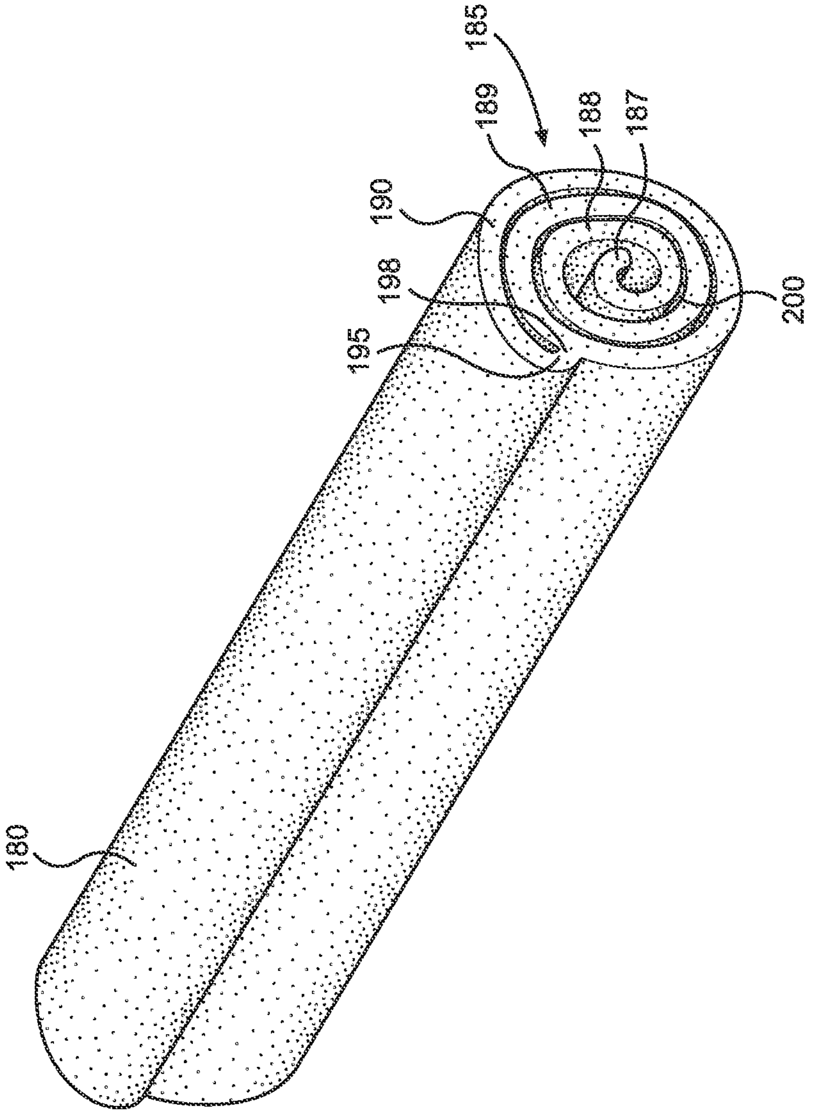
FIG. 2 is a perspective view of a spiral body pet treat according to the invention.

A pet treat 180 produced in accordance with the invention is illustrated in FIG. 2. Given the configuration of each die 10 with the plurality of radially spaced layered regions 25-28 and the radially in-turned outer terminal end region 30, the pet treats 180 of the invention have a spiraling cross-sectional body generally indicated at 185 including a plurality of radially spaced layers 187-190 and an outer terminal end portion 195 which is radially in-turned such that outermost layer 190 is conjoined at 198, particularly based on the advantageous use of the extrusion process, with adjacent, radially spaced layer 189. In other words, end portion 195 is conjoined, i.e., continuous with radially spaced layer 189. In addition, a spiraling gap 200 between the various radially spaced layers 187-190 is created upon extrusion, with gap 200 remaining, at least in part, in the final pet treat 180. This overall configuration and coupling of outer terminal end portion 195 is are important to the invention as it means outer terminal end portion 195, and correspondingly pet treat 180 overall, lacks an exposed, radially outermost, terminal spiral edge. As indicated above, it is an aspect of the invention to avoid such a terminal edge which can undesirably present sharp outer contact points.

As indicated above, pet treats 180 can be produced in various lengths without departing from the invention. In addition, the particular composition of the extruded to produce pet treats 180 can also vary. In one preferred embodiment of the invention, a known dough formulation, including ingredients derived from rice, potatoes, peas and chicken in combination with gelatin, glycerin, stabilizers and flavorings, is employed to result in pet treats 180 in the form of hard, spiraling rawhide-type chew treats for dogs. In this instance, the at least one rope is formed by extruding a dough having a moisture content of approximately 20-45% (preferably and, more preferably, 25-27%) and dryer unit 175, as well as potentially another dryer (not shown) upstream of cutting assembly 90, is employed to expedite the drying and hardening of the dough to a moisture content of approximately 8-15% (preferably 10-12%). During the drying process, the relative uniformity of layers 187-190 and the inclusion of gap 200 reduces variations in drying. The lack of an exposed terminal edge is particularly advantageous considering pet treats 180 are intended to be hard when initially consumed (chewed). Still, even with somewhat softer final products, the lack of a terminal edge is considered advantageous for other reasons, such as minimizing any unraveling of the spiral product. The use of extrusion increases the overall product formation efficiency, resulting in more uniform products with preferred layering gaps and, again, enabling the avoidance of an exposed outermost terminal spiral edge, while being reminiscent of rolled spiral chew pet treats.

Although described with reference to preferred embodiments of the invention, it should be understood that various changes and/or modifications can be made to the invention without departing from the spirit thereof. Certainly, the invention is not intended to be limited by only the description of the exemplary embodiment described. For instance, various cutting assemblies known in the art could be equally employed, such as linear or guillotine, ultrasonic or the like cutting assemblies. In addition, as indicated above, the disclosed processing steps can vary, such an additional or alternate drying step after the extrusion but before cutting. In any case, the invention is only intended to be limited by the scope of the following claims.

We claim:

1. A method of mass producing pet treats comprising:

extruding at least one rope in the form of a spiraling cross-sectional body having a plurality of radially spaced layers and an outermost layer including an end portion which is radially in-turned, conjoined and continuous with an adjacent one of the plurality of radially spaced layers;

directing the at least one rope to a cutting assembly which cuts the at least one rope at longitudinally spaced locations to create spiral shaped intermediate products; and drying the spiral shaped intermediate products to form pet treats, wherein the pet treat is formed of dough.

2. The method of claim 1, wherein the spiraling cross-sectional body includes at least three radially spaced layers.

3. The method of claim 2, wherein the spiraling cross-sectional body includes at least four radially spaced layers.

4. The method of claim 1 wherein the at least one rope is cut such that each pet treat has a length in a range of approximately 5-30 cm.

5. The method of claim 1, wherein extruding the at least one rope comprises concurrently extruding a plurality of ropes onto a conveyor in various transversely spaced rows.

6. The method of claim 5, wherein the cutting assembly constitutes a rotating cutting assembly including a roller in combination with at least one cutting blade for cutting the plurality of ropes simultaneously.

7. The method of claim 1, wherein the at least one rope is formed by extruding the dough, the dough having a moisture content of approximately 20-45% based on the weight of the pet treat and the spiral shaped intermediate products are dried such that the pet treats have a moisture content of approximately 8-15% based on the weight of the pet treat.

8. The method of claim 7, wherein the dough includes ingredients derived from rice, potatoes, peas and chicken in combination with gelatin, glycerin, stabilizers and flavorings, and the pet treats are spiraling rawhide-type chew treats.

9. A pet treat comprising a spiraling cross-sectional body having a plurality of radially spaced layers and an outermost layer including an end portion, which is radially in-turned, conjoined and continuous with an adjacent one of the plurality of radially spaced layers, wherein the pet treat is formed of dough.

10. The pet treat of claim 9, wherein the spiraling cross-sectional body includes at least three radially spaced layers and said pet treat lacks an exposed terminal edge where the end portion is conjoined with the adjacent one of the plurality of radially spaced layers.

11. The pet treat of claim 10, wherein the spiraling cross-sectional body includes at least four radially spaced layers.

12. The pet treat of claim 10, wherein the pet treat has a length in a range of approximately 5-30 cm.

13. The pet treat of claim 10, wherein the pet treat has a moisture content of approximately 8-15% based on the weight of the pet treat.

14. The pet treat of claim 13, wherein the pet treat constitutes a spiraling rawhide-type chew treat.

15. The pet treat of claim 9, wherein the end portion extends parallel to the adjacent one of the plurality of radially spaced layers and then turns inward and extends radially toward the adjacent one of the plurality of radially spaced layers.

16. The pet treat of claim 15, wherein the end portion forms a space between the end portion and the adjacent one of the plurality of radially spaced layers as the end portion extends parallel to the adjacent one of the plurality of radially spaced layers and the end portion meets the adjacent one of the plurality of radially spaced layers as the end portion extends radially toward the adjacent one of the plurality of radially spaced layers.

* * * * *